E. W. MOCH.
MACHINE FOR SPLITTING PLUME STEMS.
APPLICATION FILED OCT. 31, 1911.
1,032,418.
Patented July 16, 1912.
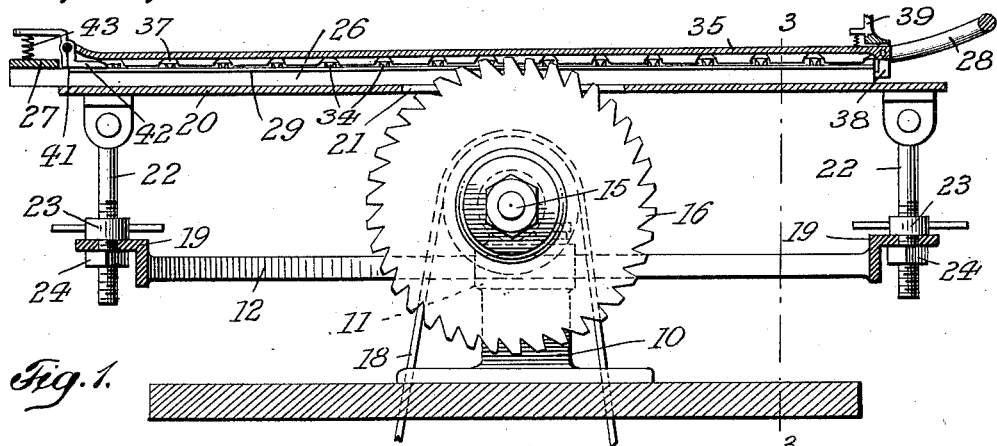
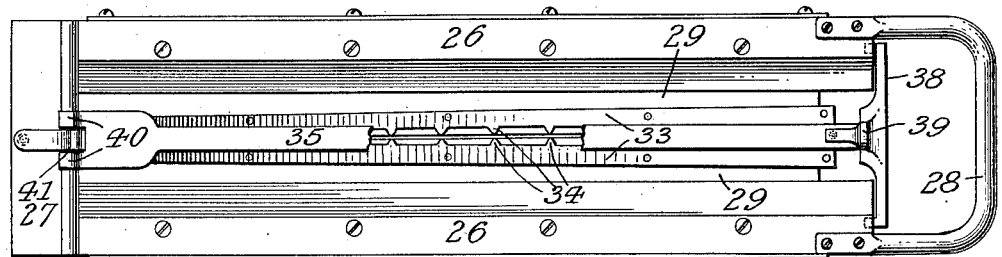
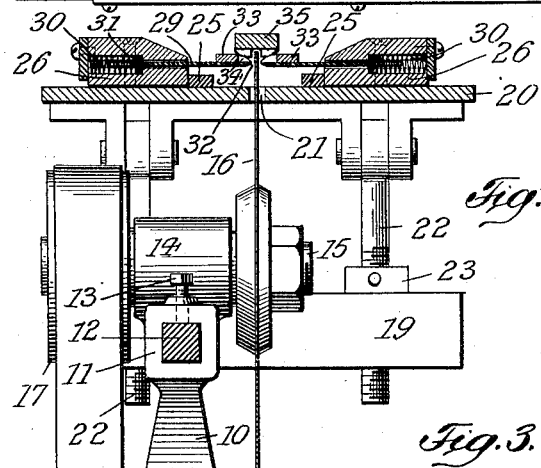
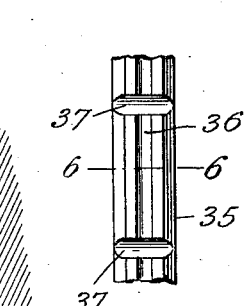
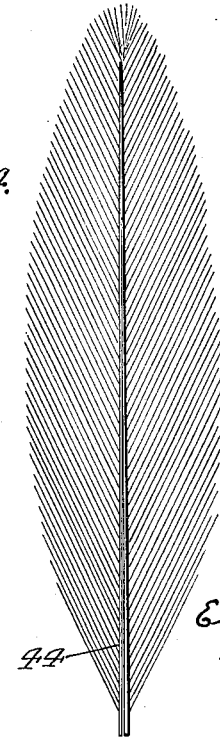
WITNESSES:
INVENTOR
Eugene W. Moch
BY
Briesen & Grumpe
ATTORNEYS.

UNITED STATES PATENT OFFICE.

EUGENE W. MOCH, OF NEW YORK, N. Y.

MACHINE FOR SPLITTING PLUME-STEMS.

1,032,418.   Specification of Letters Patent.   Patented July 16, 1912.

Application filed October 31, 1911. Serial No. 657,842.

*To all whom it may concern:*

Be it known that I, EUGENE W. MOCH, a citizen of the United States, residing at New York city, county and State of New York, have invented a new and Improved Machine for Splitting Plume-Stems, of which the following is a specification.

This invention relates to a machine of novel construction for splitting plume stems, so as to reduce the thickness of said stems and increase their pliability.

The machine is particularly adapted for splitting the stems of large and expensive plumes, as it insures an accurate guidance of the plume stem along the cutting tool during the splitting operation, so that the cut is positively made along the axis of the stem from end to end.

In the accompanying drawing: Figure 1 is a sectional side elevation of a machine embodying my invention; Fig. 2 a plan of the slide; Fig. 3 a cross section of the machine on line 3—3, Fig. 1; Fig. 4 a face view of a plume split by the machine; Fig. 5 a bottom view of part of the clamp bar, and Fig. 6 a cross section on line 6—6, Fig. 5.

A standard 10 is provided with an upper squared eye 11 that receives a bar 12, which is longitudinally adjustable upon the standard and is clamped in position by screw 13. Integral with standard 10, is the bearing 14, for the shaft 15 of a circular saw 16, driven from pulley 17 by belt 18. Bar 12 is provided at each end with a laterally extending arm 19 made of angle iron, and supporting a work table or plate 20 slotted as at 21, for the passage of saw 16. Means are provided for vertically adjusting table 20, so that the length of the projecting effective saw blade segment may be regulated. For this purpose there are pivoted to the ends of table 20, threaded rods 22 carrying nuts 23 that are supported on arms 19, so that on turning the nuts, the table may be readily raised or lowered. Jam nuts 24 carried by rods 22 below arms 19 fix the table in position after it has been set.

Table 10 is provided with a pair of guide rails 25 that flank slot 21 and are adapted to engage a plume holding slide which on being manually drawn longitudinally over the table, presents the plume stem to the action of saw 16. The slide is composed of a pair of spaced longitudinal bars 26 connected to each other at one end by a cross piece 27 and at the other end by a bail 28 constituting a handle. Bars 26 are slotted lengthwise for the reception of plate-like grippers 29 that are projected inwardly by springs 30 accommodated within corresponding recesses of the bars. Stops 31 limit the inward play of the grippers to such an extent that a gap 32 is permanently formed centrally between them, said gap being centered above saw 16 which it is adapted to accommodate.

Along the inner edge of each gripper 29, there is formed a longitudinal ledge constituting a jaw 33 provided with a plurality of spaced fingers 34. These fingers are arranged at right angles to the jaws and have beveled inner edges, that permit the ready introduction of the plume stem therebetween, so that the lower side of said stem is exposed to the action of the saw.

In order to firmly seat the plume and to hold its stem into positive contact with the saw, there is hinged to one end of the slide, a clamp bar 35 adapted to be folded centrally over the jaws, so as to bridge gap 32. This clamp bar is grooved longitudinally as at 36 and transversely as at 37 to accommodate saw 16 and fingers 34 respectively. Bar 35 may be locked in its folded position by means of a pivoted spring catch 38 engaging longitudinal bars 26 and provided with a handle 39. The rear end of bar 35 is forked as at 40 and turns on a pintle 41. The fork 40 straddles a bent toe 42 also turning on pintle 41 and adapted to bear upon the tip of the plume to be split to which it is held by a spring 43.

In use bar 35 is swung up to uncover jaws 33 and raise toe 42. The tip of the plume stem 44 is slipped underneath the toe and the latter is then lowered by slightly swinging bar 35 downward, so that the tip is securely clamped in position. Stem 44 is now pushed in between the fingers 34 and bar 35 is swung completely down and locked in position by catch 38. The slide being thus charged is drawn lengthwise over table 20 along rails 25 which so guide the slide that the plume stem remains always axially alined with the revolving saw 16. In this way the stem is accurately split along its axis without in any way interfering with or damaging the flues. After the operation is completed the bar 35 is raised and the split plume taken out, the pith of the stem being now removed if desired.

I claim:

1. A machine of the character described, comprising a slotted table, a circular saw projecting partly therethrough, a guide on the table, a slotted slide adapted to engage the guide, said slide being provided with a clamp bar adapted to be folded over a plume stem.

2. A machine of the character described, comprising a slotted table, a circular saw projecting partly therethrough, a guide on the table, and a slide adapted to engage said guide, said slide being provided with a pair of spring-influenced grippers adapted to engage a plume stem and with a clamp bar adapted to be folded over said stem.

3. A machine of the character described, comprising a slotted table, a circular saw projecting partly therethrough, a guide on the table, and a slide adapted to engage said guide, said slide being provided with a pair of spaced spring influenced grippers, jaws at the inner edges of the grippers and fingers extending transversely across said jaws.

4. A machine of the character described, comprising a slotted table, a circular saw projecting partly therethrough, a pair of guide rails on the table that flank the table-slot, and a slide engaging said rails, said slide being provided with a pair of spring-influenced grippers, and with a clamp bar extending over said grippers.

5. A machine of the character described, comprising a slotted table, a circular saw projecting partly therethrough, a pair of guide rails on the table that flank the table-slot, and a slide engaging said rails, said slide being provided with a pair of spring-influenced grippers, jaws extending along the inner edges of the grippers, and a grooved clamp bar extending over said jaws.

6. A machine of the character described, comprising a slotted table, a circular saw projecting partly therethrough, a pair of guide rails on the table that flank the table-slot, and a slide engaging said rails, said slide being provided with a pair of spring-influenced grippers, jaws at the inner edges of the grippers, fingers extending transversely across said jaws, a pivoted toe, and a pivoted clamp bar adapted to operatively engage said toe and to be folded over the jaws.

EUGENE W. MOCH.

Witnesses:
 FRANK V. BRIESEN,
 KATHERYNE KOCH.